(12) United States Patent
Nakamura (10) Patent No.: US 6,380,921 B2
(45) Date of Patent: *Apr. 30, 2002

(54) INFORMATION TERMINAL DEVICE WITH DISPLAY-ILLUMINATING MEANS

(75) Inventor: Atsunori Nakamura, Tokyo (JP)

(73) Assignee: NEC Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/280,835

(22) Filed: Mar. 30, 1999

(30) Foreign Application Priority Data

Mar. 31, 1998 (JP) .......... 10-087033

(51) Int. Cl.[7] .............. G09G 3/36
(52) U.S. Cl. .............. 345/102; 345/87
(58) Field of Search .......... 345/87, 901, 905, 345/102; 362/85; 361/681, 683, 686, 867; 364/708, 780.1; 312/257, 265.5

(56) References Cited

U.S. PATENT DOCUMENTS

| 5,379,201 A | * | 1/1995 | Friedman ............ 362/191 |
| 5,493,280 A | * | 2/1996 | Shibayama ............ 340/825 |
| 5,777,704 A | * | 7/1998 | Selker ............ 349/58 |
| 5,793,358 A | * | 8/1998 | Petkovic et al. ............ 345/168 |
| 5,815,225 A | * | 9/1998 | Nelson ............ 349/665 |
| 5,868,487 A | * | 2/1999 | Polley et al. ............ 362/33 |
| 5,898,600 A | * | 4/1999 | Isashi ............ 364/705 |
| 5,900,848 A | * | 5/1999 | Haneda et al. ............ 345/1 |
| 6,040,822 A | * | 3/2000 | Decker ............ 345/168 |
| 6,046,754 A | * | 4/2000 | Stanek ............ 345/905 |
| 6,088,025 A | * | 7/2000 | Akamine et al. ............ 345/175 |
| 6,161,944 A | * | 12/2000 | Leman ............ 362/276 |
| 6,262,884 B1 | * | 7/2001 | Hwang et al. ............ 361/681 |

FOREIGN PATENT DOCUMENTS

| JP | 63-237115 | 10/1988 |
| JP | 2-294810 | 12/1990 |
| JP | 6-119090 | 4/1994 |
| JP | 7-114429 | 5/1995 |
| JP | 10-12040 | 1/1998 |
| JP | 10-26749 | 1/1998 |

* cited by examiner

Primary Examiner—Vijay Shankar
Assistant Examiner—Nitin Patel
(74) Attorney, Agent, or Firm—Whitham, Curtis & Christofferson, P.C.

(57) ABSTRACT

An information terminal device which has: a display; a lid for covering the display while being allowed to fold up and unfold freely, and part for illuminating the display from above provided on the lid.

8 Claims, 7 Drawing Sheets

INFORMATION TERMINAL DEVICE WITH DISPLAY-ILLUMINATING MEANS

FIELD OF THE INVENTION

This invention relates to a portable-type information terminal device such as a so-called electronic notebook and the like.

BACKGROUND OF THE INVENTION

A portable-type information terminal device such as a so-called electronic notebook and the like is generally provided with a display on the main body and a foldable lid for protecting this display.

Although some of this type of portable information terminal devices are provided with no illuminating means to illuminate the display, the display is generally provided with a backlight at the bottom side since it is difficult to use it at night or at a dark place without any illuminating means for display.

Here, conventional information terminal devices with a backlight at the bottom side of display use a light-transmitting type member, such as a liquid-crystal display plate, as a display, providing with a light source at the bottom side of the display so as to illuminate the display from the back side.

In such a backlight type, since the distance from the light source to the display is very short, a plate-like illuminating-light dispersing lens called light-guiding plate is generally used to illuminate the whole part of display, so that light from the light source can be dispersed.

Also, other than such a backlight type, suggested is a terminal device that is provided with a light source such as LED at the sides of display so as to illuminate directly the surface by supplying light in the lateral direction to the display.

However, since the conventional terminal device with a backlight type of illuminating means is equipped with the light source and the light-guiding plate for dispersing illuminating-light at the bottom side of display, the thickness of device main body must increase by a thickness of the light and the light-guiding plate and the weight also must increase by that of them.

Thus, the backlight type must incur an increase in thickness and weight of the entire device, by reason of its structure. So, it has been a serious problem especially to portable type information terminal devices that the total thickness, size and weight are needed to decrease.

On the other hand, though the type that light is supplied from the sides to the display does not incur an increase in thickness of device itself, it is difficult to illuminate uniformly the entire display since light in the lateral direction is supplied to the surface of display. So, there occurs a problem that it is apt to lack in uniformity of brightness, thereby causing a reduction in visual performance on display, depending on the number and position of light sources provided.

Meanwhile, Japanese patent application laid-open No. 63-237115 (1988) discloses a compact electronic calculator that a display is installed rotatably so that it eliminates the need for a protective lid. However, though this teaches means to allow the display to rotate, it discloses no particular illuminating means and therefore gives no solution to the above problems.

Also, Japanese patent application laid-open No. 6-119090 (1994) discloses a power-saving control method that a device is switched into power-saving mode when it is not used. However, this relates to saving consumed power by switching into power-saving mode and does not describe about means for illuminating the display. SO, this gives no solution to the above problems.

SUMMARY OF THE INVENTION

Accordingly, it is an object of the invention to provide an information terminal device that can be thinned and lightened.

It is a further object of the invention to provide an information terminal device that the display can be illuminated uniformly.

According to the invention, an information terminal device, comprises:

a display a lid for covering the display, the lid being allowed to fold up and unfold freely, and means for illuminating the display from above provided on the lid.

BRIEF DESCRIPTION OF THE DRAWINGS

The invention will be explained in more detail in conjunction with the appended drawings, wherein:

FIG. 1A shows a state that the illuminating means is turned off and FIG. 1B shows a state that the illuminating means is turned on, FIG. 2 is a block diagram showing a controller of the information terminal device with display-illuminating means in the first embodiment, FIG. 4A shows a state that the illuminating means is turned off and FIG. 4B shows a state that the illuminating means is turned on, FIGS. 5A to 6B are enlarged partial views showing the illuminating means in the turn-on and turn-off states in the information terminal device with display-illuminating means in the second embodiment, in detail, FIGS. 5A and 6A are partial perspective views and FIGS. 5B and 6B are partial cross sectional side views.

DESCRIPTION OF THE PREFERRED EMBODIMENTS

Information terminal devices with display-illuminating means in the preferred embodiments will be explained below, referring to the drawings.

<First Embodiment>

Figure 1A:
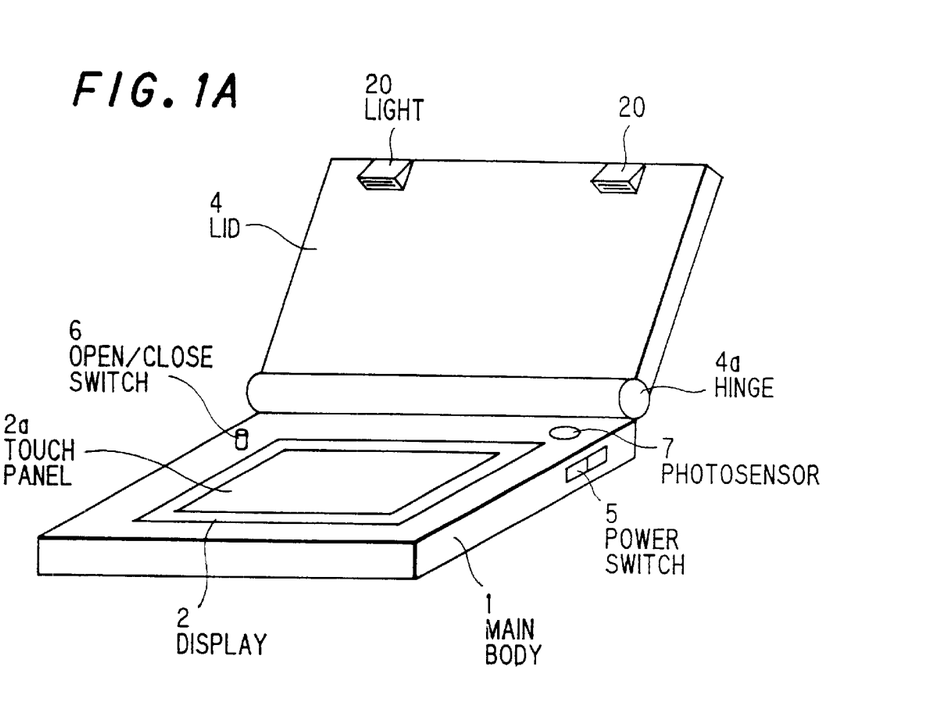
FIGS. 1A and 1B are general perspective views showing an information terminal device with display-illuminating means in a first embodiment according to the invention, in detail.
Figure 1B:
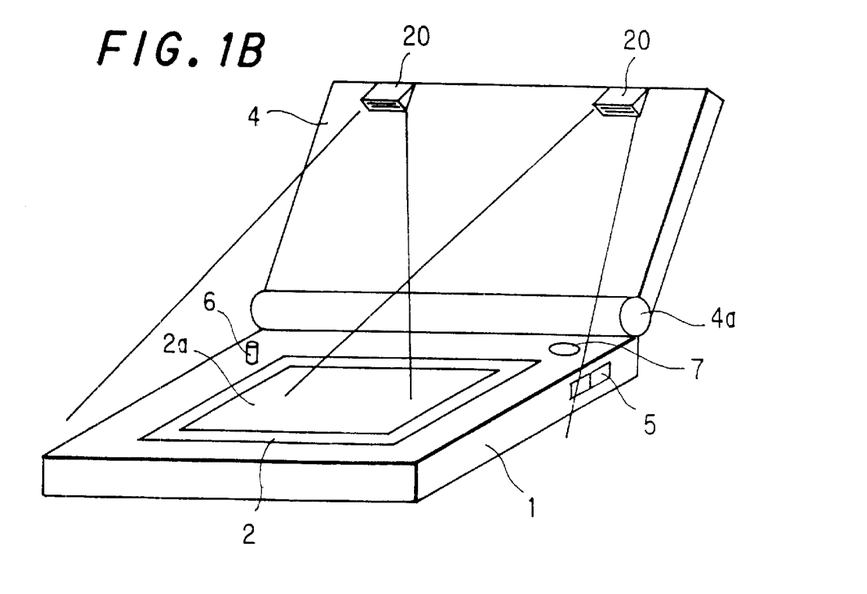
Figure 2:
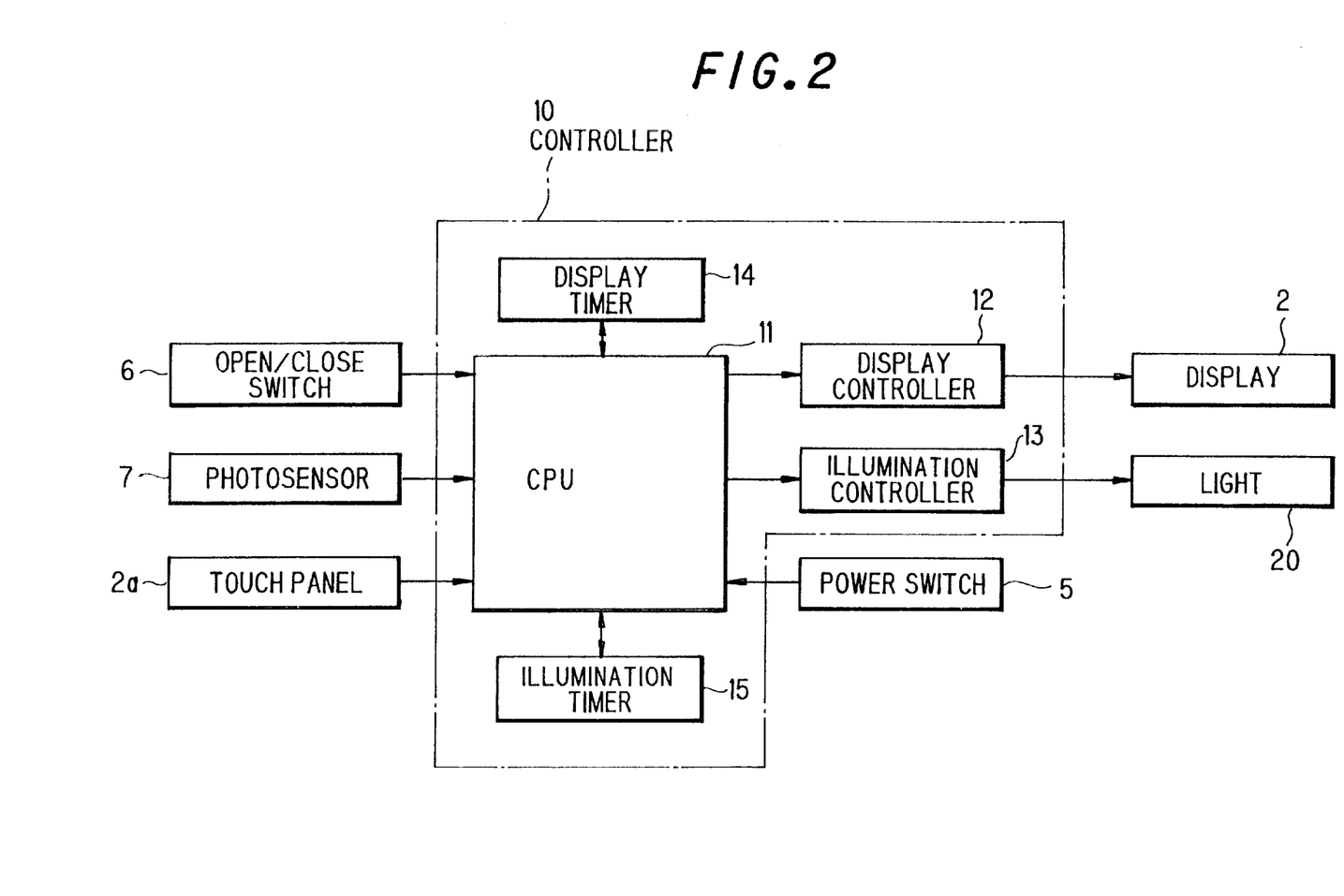
Figure 3:
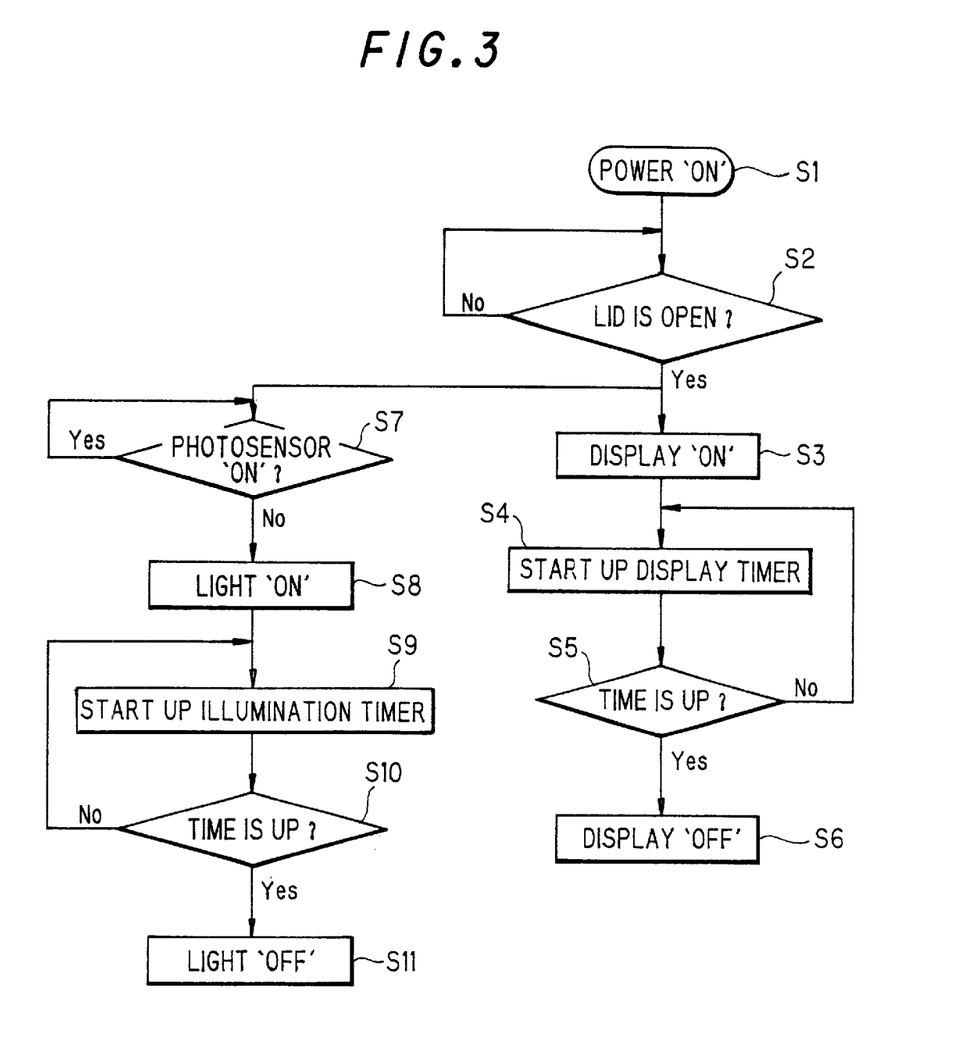
FIG. 3 is a flow chart showing the operation of the information terminal device with display-illuminating means in the first embodiment.

First, an information terminal device with display-illuminating means in the first preferred embodiment according to the invention is explained in FIGS. 1 to 3.

FIGS. 1A and 1B are general perspective views showing the information terminal device with display-illuminating means in the first embodiment according to the invention. FIG. 1A shows a state that the illuminating means is turned off and FIG. 1B shows a state that the illuminating means is turned on.

FIG. 2 is a block diagram showing a controller of the information terminal device with display-illuminating means in this embodiment.

FIG. 3 is a flow chart showing the operation of the information terminal device with display-illuminating means in this embodiment.

As shown in FIG. 1A, the information terminal device in this embodiment is a display 2 with a touch panel 2a on a main body 1.

Also, a lid 4 for protecting the display is provided connecting through a hinge 4a to the top edge of the back side of the main body 1 while being allowed to fold up.

By folding up the lid 4 over the main body 1, the display 2 can be protected covered therewith. The main body 1 becomes available by unfolding the lid 4.

Also, at the side of the main body 1, a power switch 5 for turning on/off the main power supply of device is provided.

Furthermore, on the top face of the main body 1, as shown in FIG. 1A, an open/close switch 6 to detect the opening/closing of the lid 4 and a photosensor 7 to detect the ambient brightness/darkness of the main body 1.

The open/close switch 6 is pressed down and disconnected by the foldable lid 4. When the lid 4 is open, the switch 6 connects, and when the lid 4 is closed folded up, the switch 6 disconnects. Then, the switch 6 outputs ON/OFF signal to CPU 11 of the controller 10 as detailed later.

On the other hand, the photosensor 7, which is a sensor to detect the ambient brightness of the main body 1, outputs ON/OFF signal to CPU 11 of the controller as detailed later according to the ambient brightness/darkness of the main body 1.

Furthermore, the terminal device in this embodiment thus composed is, as shown in FIG. 1A, provided with lights 20, 20 as illuminating means at the top end of the lid 4.

These lights 20, 20 are disposed at two positions of the top end of the lid 4, and the light-projecting directions are set to direct to the display 2 when the lid 4 is unfolded.

Thereby, the entire display 2 can be illuminated by the lighting of the lights 20, 20 from above.

Meanwhile, as long as the lights 20, 20 can illuminate the entire display 2 from above, the position and number of the lights disposed at the top end of the lid 4 are not limited particularly.

The turn-on/turn-off of the lights 20, 20 is controlled by the controller 10 provided in the main body 1.

The controller 10 provided in the main body 1 is explained, referring to FIG. 2. As shown, the controller 10 of the terminal device in this embodiment is provided with CPU 11 connecting with the power switch 5, and is connected with the open/close switch 6, photosensor 7 and touch panel 2a through the input ports of CPU 11.

Thereby, the open/close switch 6, photosensor 7 and touch panel 2a through the input ports of CPU 11 can interrupt to the operation of CPU 11 through the input ports.

Also, CPU 11 is connected with a display controller 12 to control the display 2, and the image process and power control of the display 2 can be performed by the display controller 12.

Further, CPU 11 is connected with an illumination controller 13 to control the light 20, and the turn-on/off of the light 20 can be controlled by the illumination controller 13.

Also, CPU 11 is provided with timer means of a display timer 14 and an illumination timer 15.

The display timer 14 monitors the touch panel 2a, when a certain time period passes away with the touch panel 2a being not operated, turning off the supply of power to the display 2 though the display controller 12 to save the power. When the touch panel 2a is operated, the timer is released and thereby the power is supplied to the display 2 again.

On the other hand, the illumination timer 15 monitors the touch panel 2a, when a certain time period passes away with the touch panel 2a being not operated, turning Off the supply of power to the light 20 though the illumination controller 13 to save the power. When the touch panel 2a is operated, the timer is reset and thereby the power is supplied to the light 20 again.

The operation of the information terminal device with display-illuminating means thus composed is explained below.

First, when the lid 4 is closed, since the open/close switch 6 is pressed down by the lid 4, the main body 1 is electrically turned OFF. Also, in this state, since the power is not supplied to the photosensor 7 as well, the photosensor 7 falls into uncertain state and does not operate.

Then, turning ON the power switch 5, though the open/close switch 6 is turned OFF while the lid 4 is closed, when the lid 4 is open, the open/close switch 6 turns ON.

Thereby, power is supplied to the photosensor 7, when the ambience of device is light, and CPU 11 of the controller 10 recognizes that the ambience is light since the photosensor 7 detects the brightness.

On the other hand, when the ambience of device is dark, the photosensor 7 remains turned OFF and therefore CPU 11 recognizes that the ambience is dark.

Thereby, CPU 11 outputs a signal to the display controller 12 and the light 20 turns ON for a certain time period. Therefore, the user can confirm the content of display and operate the touch panel 2a.

When the touch panel 2a of the main body 1 is not operated during a certain time period, through the monitoring of the display timer 14, the light 20 is turned OFF automatically by CPU 11.

Also, when the lid 4 is closed, since the open/close switch 6 is pressed down by the lid 4, the light 20 turns OFF even when the power switch 5 is turned ON.

Thus, in the terminal device of this embodiment, the light 20 does not turn ON unless the lid 4 is opened and it turns OFF when the lid 4 is closed. Therefore, since the turn-off operation of the light 20 is not necessary, the handling performance of the terminal device can be enhanced and the wasteful power consumption due to neglecting to turn off the light 20 can be prevented.

Also, with the photosensor 7 detecting the ambient brightness of device, the light 20 turns ON only when it is so dark that the illumination is necessary, and the light 20 turns OFF when the ambience is light. Therefore, the wasteful consumption of power can be avoided and an efficient illumination effect can be obtained. In addition, the turn-on/off operation is not necessary since the light 20 is turned on/off automatically according to the ambient brightness.

Furthermore, with the timer means, even the light 20 turned on is turned off when the terminal device is not operated during a given time period. Therefore, since the light 20 unavailable is not left as it turns on, the wasteful consumption of power can be avoided.

Also, since the light 20 turns on immediately when the terminal device is operated, the user does not need to pay attention to the turn-on of the light 20.

The operational steps of the information terminal device with display-illuminating means thus composed is explained below, referring to the flow chart in FIG. 3.

First, when the power switch 5 is operated to turn on power at step 1, CPU 11 determines whether the lid 4 is open or closed by checking the state of the open/close switch 6 connecting with the input port (step 2).

At this time, when the lid 4 is closed, OFF signal is output to CPU 11 since the open/close switch 6 is pressed down by the lid 4.

CPU 11 recognizes that the lid 4 is closed, by reading this signal.

Therefore, in this case, being determined that the main body 1 is not used, the display 2 does not turn ON.

On the other hand, when the lid 4 is open, ON signal is output to CPU 11 since the open/close switch 6 is released (connected).

CPU 11 recognizes that the lid 4 is open, by reading this signal, determining that the main body 1 is in use, instructing the display controller 12 to turn ON the display 2 and to display a necessary display image (step 3).

Simultaneously, the display timer 14 starts monitoring (step 4).

The display timer 14 monitors if a certain time period passes away with the touch panel 2a of the main body 1 being not operated (step 5), when the certain time passes away without being operated, determining the time is up, turning off the display 2 to save power (step 6).

At this time, when the touch panel 2a is touch-operated, the timer is released, and the display 2 turns ON and the display timer 14 starts monitoring again (step 4).

On the other hand, when it is determined that the lid 4 is open at step 2, power is supplied to the photosensor 7 while turning ON the display 2, thereby the ambient brightness of main body 1 is determined through the photosensor 7 (step 7).

In detail, when a sufficient amount of light is supplied to photosensor 7, the photosensor 7 outputs ON signal to CPU 11 and CPU 11 recognizes that the ambience of the main body 1 is light by reading this signal.

On the contrary, when a sufficient amount of light is not supplied to photosensor 7, the photosensor 7 outputs OFF signal to CPU 11 and CPU 11 recognizes that the ambience of the main body 1 is dark by reading this signal.

When CPU 11 recognizes that the ambience of the main body 1 is dark, CPU 11 controls the illumination controller 13 to turn ON, thereby turning on the light 20 (step 8).

When the light 20 turns on, the illumination timer 15 simultaneously starts monitoring (step 9).

The illumination timer 15 monitors if a certain time period passes away with the touch panel 2a of the main body 1 being not operated (step 10), when the certain time passes away without being operated, determining the time is up, turning off the light 20 to save power (step 11).

At this time, when the touch panel 2a is touch-operated, the timer is released, and the light 20 turns ON and the illumination timer 15 starts monitoring again (step 9).

As described above, in the information terminal device with display-illuminating means in this embodiment, since the light 20 as the illuminating means is provided on the lid 4 for protecting the display 2, it is not necessary to install any backlight with a certain thickness and weight at the bottom side of display like the conventional terminal devices. Therefore, the terminal device can be lightened and thinned freely, and further its manufacturing cost can be reduced since it needs no light-dispersing lens.

Also, with the light 20 disposed at the top end of the lid 4, light can be supplied to the entire display 2 from above. Since the position of the light 20 can be adjusted by moving rotationally the lid 4, the entire display 2 can be illuminated uniformly. So, the display 2 can be seen surely even at night and at a dark place.

Namely, in this embodiment, the light source is located above the main body 1, thereby a distance from there to the display 2 can be obtained much and light can be dispersed sufficiently and naturally, therefore the top face including the display 2 can be illuminated totally. Thus, since light is supplied to the wide rage of the display 2, the terminal device with enhanced visual and handling performances can be obtained.

Furthermore, with light supplied from above the display 2, the display 2 can be illuminated efficiently and uniformly and therefore can be seen sufficiently even by a slight amount of light illumination. Hence, the light 20 itself can be miniaturized and the consumed power of the light 20 can be saved.

In addition, in the information terminal device with display-illuminating means in this embodiment, only when the illumination is necessary the light 20 is turned on then turned off automatically with the open/close switch 6, photosensor 7 and timer means. The turn-on/off operation of the light 20 is not necessary. Therefore, the handling performance of the terminal device can be enhanced and the wasteful power consumption due to neglecting to turn off the light 20 can be prevented securely.

<Second Embodiment>

An information terminal device with display-illuminating means in the second preferred embodiment according to the invention is explained referring to the drawings.

Figure 4A:
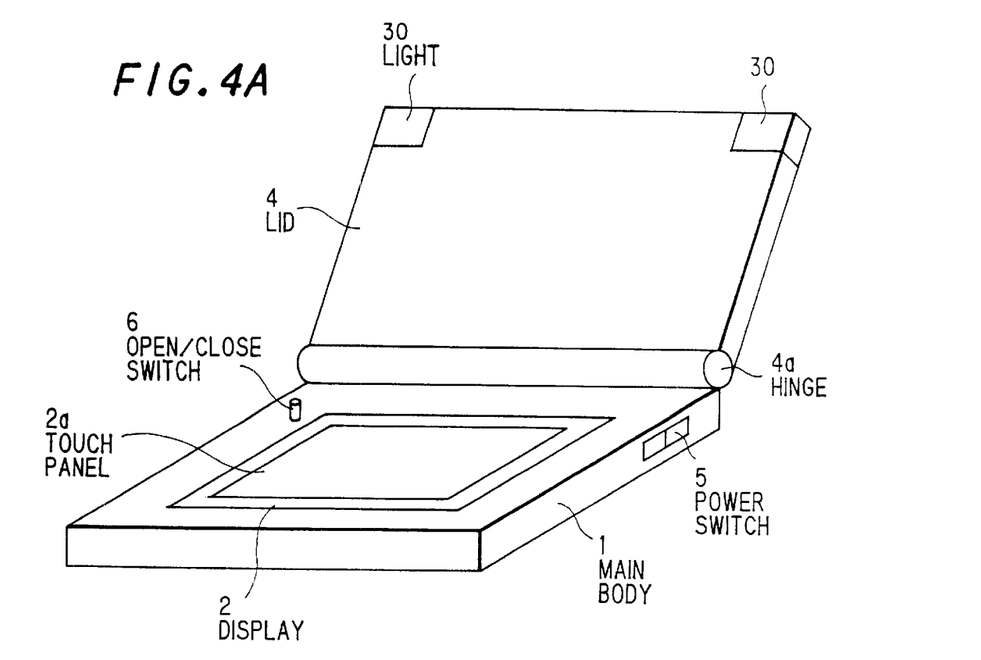
FIGS. 4A and 4B are general perspective views showing an information terminal device with display-illuminating means in a second preferred embodiment according to the invention, in detail.
Figure 4B:
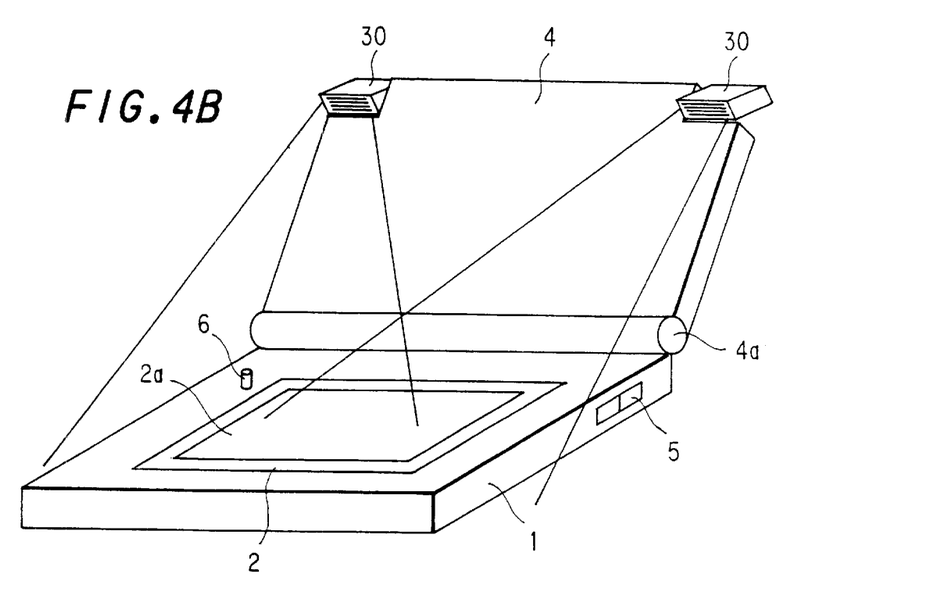

FIGS. 4A and 4B are general perspective views showing the information terminal device with display-illuminating means in the second embodiment according to the invention. FIG. 4A shows a state that the illuminating means is turned off and FIG. 4B shows a state that the illuminating means is turned on.

Figure 5A:
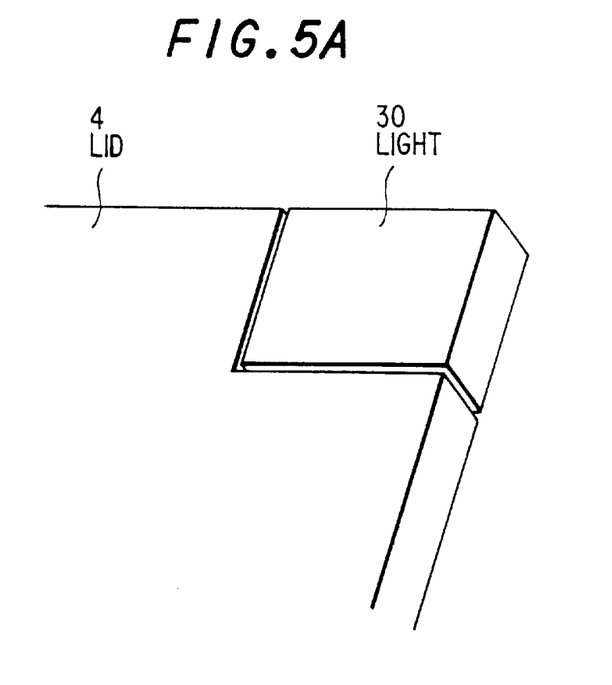
Figure 5B:
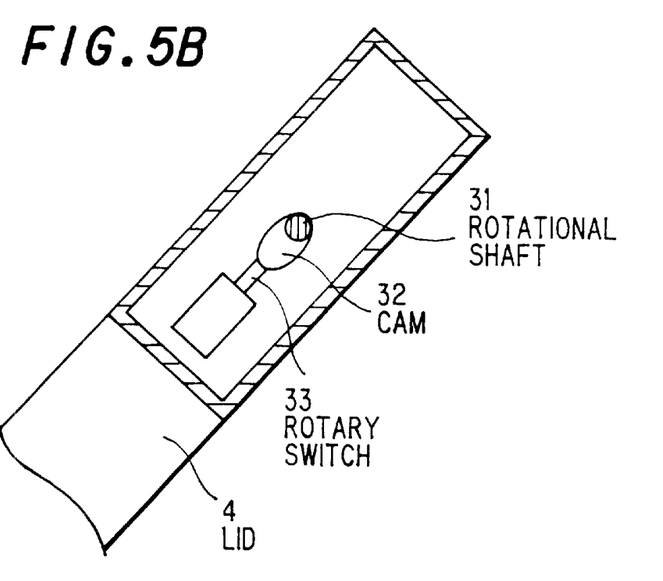
Figure 6A:
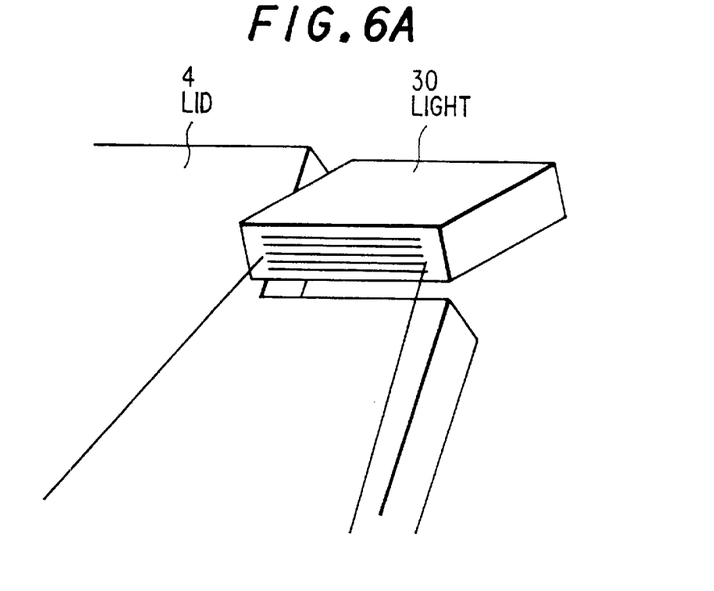
Figure 6B:
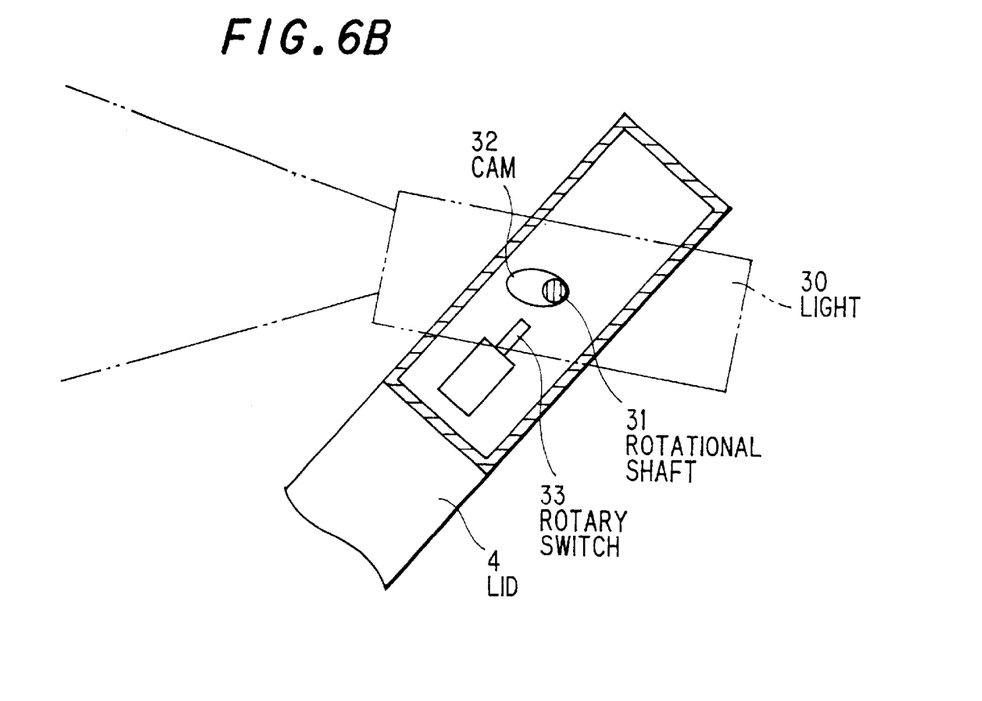

FIGS. 5A to 6B are enlarged partial views showing the illuminating means in the turn-on and turn-off states in the information terminal device with display-illuminating means in this embodiment. FIGS. 5A and 6A are partial perspective views and FIGS. 5B and 6B are partial cross sectional side views.

Figure 7:
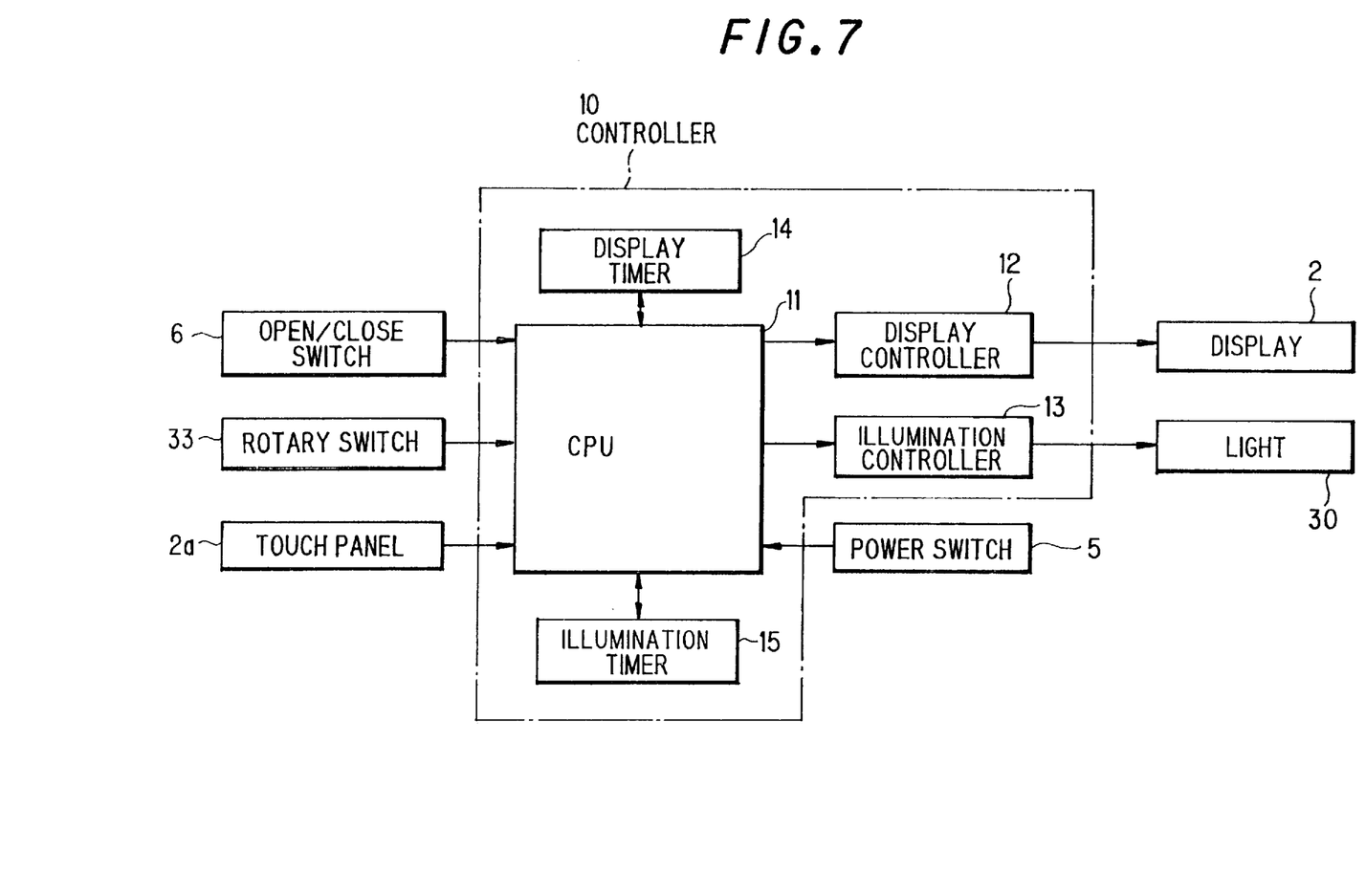
FIG. 7 is a block diagram showing a controller of the information terminal device with display-illuminating means in the second embodiment.

FIG. 7 is a block diagram showing a controller of the information terminal device with display-illuminating means in this embodiment.

As shown in these drawings, the information terminal device with display-illuminating means in this embodiment is a modification of the first embodiment described above. Instead of the light 20 of fixed type, lights 30 are provided rotatably on the lid. The other components in this embodiment are almost similar to those in the first embodiment. Therefore, like parts are indicated by like reference numerals as used in the first embodiment and their explanations are omitted.

Namely, the terminal device in this embodiment is provided with the light 30 as the illuminating means, and the light 30 are disposed rotatably toward the display.

In detail, as shown in FIGS. 4A and 4B, the illuminating means in this embodiment is structured such that both of the top-end side parts of the lid 4 can move rotatably toward the display 2 of the main body 1. The lights 30 are installed at the bottom side of the side parts.

Also, as shown in FIGS. 5A and 5B, a rotary switch 33 that connects and disconnects according as the light 30 rotates is provided in the lid 4 and inside the light 30.

Namely, the lights 30 are installed rotatably around a rotational shaft 31 at both of top-end side parts, and a cam 32 that rotates with the rotational shaft 31 is provided.

Also, the rotary switch 33 is disposed such that it disconnects (state in FIG. 5B) and connects (state in FIG. 6B) according as the cam 32 rotates.

The rotary switch 33 can detect that the light 30 is rotated from the storage position shown in FIG. 5B to the position shown in FIG. 6B, by being pressed down by the cam 32 then released therefrom. Also, as shown in FIG. 7, it is connected with the input port of CPU 11, through which it outputs signal as a detection result.

Namely, as shown in FIG. 6B, when the light 30 rotates with the rotational shaft 31 and thereby the cam 32 fixed onto the rotational shaft 31 releases the rotary switch 33, OFF signal is output to CPU 11, which controls the illumination controller 13, based on this OFF signal, to turn on the light 30.

On the other hand, as shown in FIG. 5B, when the light 30 returns to the storage position, the cam 32 fixed onto the rotational shaft 31 presses down the rotary switch 33 and thereby ON signal is output to CPU 11, which controls the illumination controller 13 to turn off the light 30.

In this embodiment thus composed, since the turn-on/turn-off of the light 30 is performed by the rotation operation of the light 30, the photosensor 7 in the first embodiment is not necessary to provide. Also, comparing with the light 20 fixed onto the lid 4, the direction of supplying light can be adjusted regardless of an open angle of the lid 4. Therefore, the illumination can be supplied more stably.

Accordingly, with the information terminal device with display-illuminating means in this embodiment, by rotating arbitrarily the light 30 as the illuminating means toward the display 2, an optimum illumination position for the display 2 can be obtained adjusting freely. Thus, a more convenient terminal device can be obtained.

Also, since the light 30 turns on/off according as the light 30 rotates, the light 30 can be turned on/off automatically by only rotating the light 30. Thus, the turn-on/turn-off operation of the light 30 can be performed very easily, and neglecting to turn off it can be prevented securely.

Furthermore, since the mechanism for turning on/off the light 30 can be composed simply by only the rotational shaft 31 and cam 32, the manufacturing cost of terminal device can be more reduced.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching here is set forth.

What is claimed is:

1. An information terminal device, comprising,
   a display
   a lid for covering said display, said lid being allowed to fold up and unfold freely, and means for illuminating said display from above, wherein said means for illuminating is provided at a top end of said lid and disposed on said lid, and wherein light emitted from said means for illuminating said display is directed to said display when said lid is unfolded.

2. An information terminal, according to claim 1, wherein said display-illuminating means is disposed on the top end of said lid which is a remote end from said display.

3. An information terminal device, according to claim 1, further comprising:
   a switch that connects and disconnects as said lid is opened and closed;
   wherein said display-illuminating means turns on and off accordingly as said switch connects and disconnects.

4. An information terminal device, according to claim 1, further comprising:
   a photosensor;
   wherein said display-illuminating means turns on and off according to a signal from said photosensor.

5. An information terminal device, according to claim 1, further comprising:
   a timer means that turns off said display-illuminating means when said information terminal device is not operated during a certain time period.

6. An information terminal device, according to claim 1, wherein
   said display-illuminating means is disposed rotatably toward said display.

7. An information terminal device, according to claim 6, further comprising:
   a rotary switch that connects and disconnects according as said display-illuminating means rotates;
   wherein said display-illuminating means turns on and off according as said rotary switch connects and disconnects.

8. An information terminal device, comprising:
   a display;
   a lid for covering said display, said lid being allowed to fold up and unfold freely; means for illuminating said display from above provided on said lid and disposed rotatably toward said display;
   a rotational shaft mounting said display illuminating means to said lid;
   a rotary switch mounted to said lid; and
   a cam provided at an end of said rotational shaft, said cam rotating with said rotational shaft;
   wherein said cam releases said rotary switch when said display illuminating means is rotated into a first position and said cam presses down said rotary switch when said display illuminating means is rotated into a stored position.

* * * * *